United States Patent [19]
Baker

[11] 4,447,707
[45] May 8, 1984

[54] ELECTRICALLY HEATED MULTI-SECTION HOSE HAVING ELECTRICALLY HEATED HOSE JOINTS

[75] Inventor: Robert G. Baker, Buford, Ga.
[73] Assignee: Nordson Corporation, Amherst, Ohio
[21] Appl. No.: 333,378
[22] Filed: Dec. 22, 1981
[51] Int. Cl.³ .................. H05B 5/62; F16L 53/00; B67D 5/62; H01R 4/64
[52] U.S. Cl. .................. 219/301; 137/341; 138/33; 174/47; 219/300; 219/307; 219/522; 219/541; 222/146 HE; 285/41; 339/15
[58] Field of Search .............. 219/296, 298, 299, 300, 219/301, 306, 308, 307, 522, 547, 421, 541; 339/15; 285/41; 137/341; 222/146 H, 146 HE, 146 R; 174/47; 138/33

[56] References Cited
U.S. PATENT DOCUMENTS

| | | | |
|---|---|---|---|
| 2,000,716 | 5/1935 | Polk | 339/15 X |
| 2,178,721 | 11/1939 | Daniels | 219/300 X |
| 2,669,299 | 2/1954 | Roach | 219/307 X |
| 2,793,280 | 5/1957 | Harvey | 137/341 |
| 2,801,323 | 7/1957 | Heron | 219/522 X |
| 3,099,737 | 7/1963 | Naxon | 219/307 |
| 3,197,613 | 7/1965 | Ciemochowski | 219/307 |
| 3,406,276 | 10/1968 | Haas | 219/306 |
| 3,791,415 | 2/1974 | Lawless et al. | 219/301 X |

FOREIGN PATENT DOCUMENTS 1459538  2/1969  Fed. Rep. of Germany ...... 219/307

Primary Examiner—A. Bartis
Attorney, Agent, or Firm—Wood, Herron & Evans

[57] ABSTRACT

A hot melt hose has multiple electrically heated hose sections physically and electrically interconnected end-to-end between a pressurized hot melt source and hot melt dispenser, such as a hand-held gun having a trigger-controlled valve for regulating the flow of hot melt from the gun. Each of the hose sections includes an inner, fluid impervious, chemically inert tube, preferably fabricated of tetrafuoroethlene; an electrically conductive multi-strand braided resistance heating sheath snugly embracing the exterior surface of the inner tube and in intimate heat transfer contact therewith for supplying strength and heat to the tube; and an outer sheath of thermal insulating material for minimizing heat loss. The hose sections are interconnected by a heated joint which comprises electrically conductive hose end fittings electrically connected to the braided sheath and connected by threaded swivel nuts to an electrical insulating fitting. Internally of the insulating fitting there is an electrical resistance heater spring which extends between and electrically interconnects the hose end fittings. The spring has an electrical resistance such that the flow of current from the braided sheath of one hose section to that of the other produces sufficient heat in the fitting so that the interior of the joint is maintained at approximately the same temperature as the interior of the hose sections.

18 Claims, 2 Drawing Figures

ELECTRICALLY HEATED MULTI-SECTION HOSE HAVING ELECTRICALLY HEATED HOSE JOINTS

This invention relates to a hot melt multi-section hose heating system, and more particularly to a heating system for a hot melt hose having multiple series-connected sections interconnected by a connector joint.

Hot melt dispensing systems of the type with respect to which this invention is applicable typically include a source, or tank, of molten adhesive. The adhesive is maintained at a desired temperature in the tank, such as 350° F. by a suitable thermostatically controlled tank heater. The molten adhesive is supplied under pressure by a pump to a dispenser via a hose. The dispenser may be a hand-held gun having a trigger-controlled valve for regulating the flow of hot melt adhesive from the gun. To avoid undesirable temperature drop in the hot melt adhesive between the time it is pumped from the tank and the time it is dispensed from the gun, the hose interconnecting the pressurized source of hot melt material and the dispenser is usually heated.

As would be expected, the required length of hose between the pressurized source and the dispenser varies from one application to another. While it is possible to accommodate these different length hose requirements by connecting single hoses of different length between the tank and gun, it has been found more convenient to provide hose sections of some arbitrary, but fixed, length such as ten feet. Depending upon the length of hose required for a particular application, different numbers of these fixed-length hoses can be serially connected end-to-end to provide a multi-section hose of the desired length.

A typical heated hot melt hose includes an inner tube through which the hot melt adhesive actually flows. This inner tube, which is in contact with the adhesive, is fluid impervious and chemically inert relative to the hot melt material. The inner tube additionally possesses certain other desirable characteristics such as strength, flexibility, electrical nonconductivity, and the like. A suitable material for the inner tube, exhibiting the foregoing characteristics, has been found to be tetrafluoroethylene. The hot melt hose also typically includes a single layer of stainless steel wire braid which surrounds the inner tube. The wire braid performs the dual function of providing structural reinforcement for the tube as well as serving as an electrical resistance heater for the tube along its length. For these reasons the single layer stainless steel wire braid reinforcement snugly embraces the outer surface of the inner tube as well as is in intimate thermal contact therewith. Surrounding the metal braid is a sheath of electrically nonconductive thermal insulating material for minimizing heat loss to the environment.

In the past the sections of hose used in a given installation have been interconnected by conventional heat and electrically conductive metal joints. But, the only heat imparted to those joints was the heat conducted through the hose end fittings from the braided section of the hoses with the result that those hose joints were at a lower temperature than the adjacent braided hose sections. Consequently, the molten adhesive tended to cool in the course of passage through the hose joints, thereby creating a problem in maintaining the molten adhesive at an even temperature.

It has therefore been an objective of this invention to provide an improved multi-section heater hose for transporting molten adhesive in which the adhesive is not cooled in the course of passage through the hose joints interconnecting the multiple sections of hose.

Still another objective of this invention has been to provide a multi-section hose having an improved system for heating the hose throughout its length without the occurrence of any cold or cool spots throughout the length of the hose. These objectives are achieved and this invention is predicated upon the concept of heating the multiple sections of a multi-section hose via an electrical resistance braiding wrapped about the hose sections and heating the hose joint via an electrical resistance spring located internally of the joint to which electrical current is supplied via the hose braiding through electrically conductive hose end fittings in the end of the hose sections. The electrical resistance of the spring is chosen so that it imparts sufficient heat to the hose joint to maintain the adhesive at a fixed temperature or to melt solidified adhesive within the joint as a consequence of the same current flow through the spring as occurs through the hose braiding. Consequently, the construction results in a hose having a heated hose joint wherein there is no need for auxiliary electrical leads or power supplies to the heater of the hose joint.

The primary advantage of this invention is that it provides a multi-section heated hose wherein the joints of the system are heated without the requirement for any additional electrical leads or auxiliary power supplied to the joint heater. This invention also has the advantage of utilizing hose swivel joints which are conventional except for the choice of materials of which this joint is manufactured. Consequently, no special tools, electrical wiring or other special arrangements are to be made when substituting the multi-section heater hose having heated hose joints of this invention for conventional heated hoses now in use in adhesive dispensing systems.

In one particular application of this invention wherein the hose was maintained at a temperature of 350° F., 28 amperes of current was passed from a constant current power source through the braided sheaths of the series-connected hose. This particular hose consumed a total power input of 48.6 watts per foot of hose to maintain the hose at 350° F. The joints of this hose required a power imput of approximately 10 watts to maintain an operating temperature of 350° F. Therefore, a heater for the joint having a resistance of 0.013 ohms was required if the 28 amperes power supply of the braided hose was to be used to heat the joint. A spring having this resistance and capable of operation at 425° F. without losing its resiliency was made by coiling 18-8 type 302 stainless steel spring stock having a cross section 0.031 inches thick by 0.250 inches wide into a helical configuration approximately 0.290 inches in outside diameter by 1.375 inches in length and at a pitch of approximately ⅜ inch.

With the foregoing hose and joint configuration, the joint of the multi-section hose is heated from the same constant current power supply as is the braided hose. Therefore, there is no need for auxiliary electrical leads to the joint heater or for an auxiliary power supply different from that used to heat the hose sections.

These and other features, advantages, and objectives of the invention will become more readily apparent from a detailed description of the invention taken in conjunction with the drawings in which.

Figure 1:
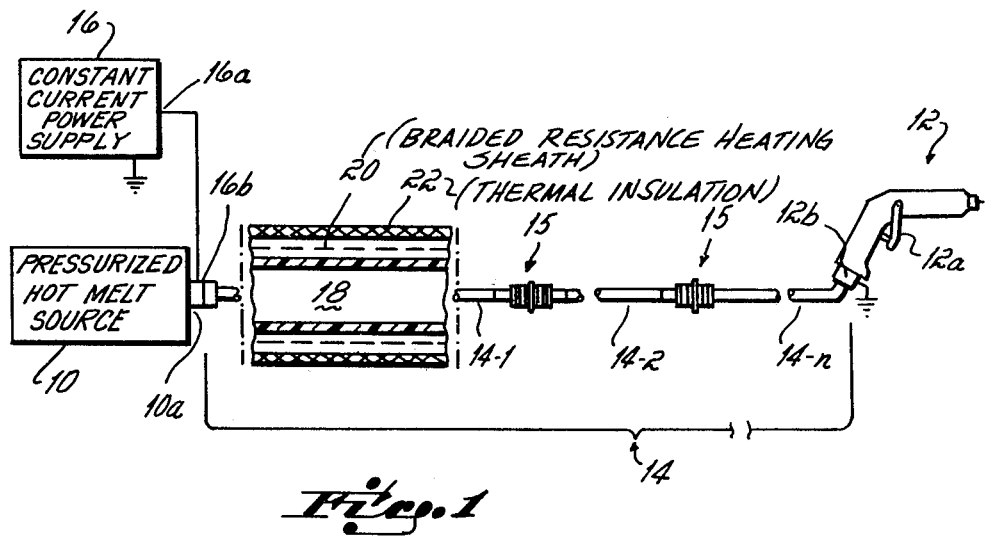
FIG. 1 is a schematic diagram of a hot melt multi-section hose heating system incorporating this invention.

With reference to the drawings, the system of this invention is seen to include a pressurized source 10 of hot melt adhesive which is equipped with a suitable thermostatically controlled heater (not shown) for maintaining molten adhesive at a desired temperature, such as 350° F. Of course, by suitable adjustment of the heater the temperature of the molten adhesive in the tank 10 can be adjusted to any desired temperature compatible with the particular chemical composition of the adhesive.

Also included in the system is a molten adhesive dispenser 12. The dispenser 12 can be of the hand-held variety, such as a gun, having a manually operated trigger 12a which controls a flow valve (not shown) in the gun for selectively regulating the flow of pressurized molten adhesive from the gun dispenser. Alternatively, the dispenser 12 may be of the type typically found in an automatic installation in which the dispenser is either stationarily mounted, such as in operative relation to a conveyor line on which articles move therepast for receiving shots of molten adhesive, or alternatively, movably mounted on a suitable motorized reciprocator under automatic control for applying molten adhesive to an article in a predetermined pattern.

Interconnecting the dispenser 12 and the tank 10 is a multi-section hose 14 consisting of individual sections 14-1, 14-2, . . . 14-n. The hose sections 14-1, 14-2, . . . 14-n are provided with suitable coupling elements 15 at their respective ends to facilitate serial interconnection between an outlet 10a of the tank 10 and an inlet 12b of the dispenser 12. The heating elements to be described, of the hose sections 14-1, 14-2, . . . 14n of the hose assembly 14 are connected in electrical series relationship with the output 16a of a regulated constant current power supply 16 via an electrical conductive connector 16b. The power supply 16 is provided with a suitable control (not shown) which facilitates selectively varying the amperage output therefrom on line 16a to the heaters of the hose assembly 14 to, in turn, facilitate selectively varying the temperature at which the hose sections 14-1, 14-2, . . . 14-n of the hose assembly 14 are commonly maintained.

In accordance with the preferred embodiment of the invention, at least one of the hose sections, such as section 14-1, includes an inner tube 18 which is chemically inert and fluid impervious relative to the hot melt material passing therethrough from the pressurized hot melt tank 10 to the dispenser 12. A suitable inner tube 18 can be fabricated of tetrafluoroethylene resin extruded to form a smooth seamless tube having an inner tube diameter of approximately 0.313 inches with a wall thickness of 0.040 inches. Surrounding the inner tube 18 is a braided sheath 20 of electrically conductive resistance heating material. In a preferred form, the sheath 20 consists of 120 strands of braided wire having a one inch pitch. By reason of the pitch and braid diameter, the strands are 18.49 inches per foot of braid. The wire strands are fabricated of 0.009 inch diameter 303 stainless steel, providing a resistance per strand per foot of braid of 7.44 ohms. With a braided sheath of the type described, the total resistance of the sheath per foot is 0.062 ohms. When input with a constant current of 28 amperes, a power consumption of 48.6 watts per foot results.

The braided sheath 20 provides the dual function of supplying heat to the tube 18 for maintaining the temperature therein at some preset desired value, such as 350° F. as well as providing the tube 18 with added structural strength against bursting. To maximize the strength and heat transfer provided to the inner tube 18 by the braided sheath 20, the braided sheath snuggly embraces the outer surface of the tube 18 with respect to which it is in intimate thermal contact.

Surrounding the braided electrically conducting sheath 20 is a sheath 22 of thermal insulating material, such as silicone rubber sponge plastic material having a wall thickness of 0.500 inches. If desired, the thermal insulation sheath 22 can be provided with a polyester web outer jacket to enhance the abrasion resistance of the hose assembly.

Figure 2:
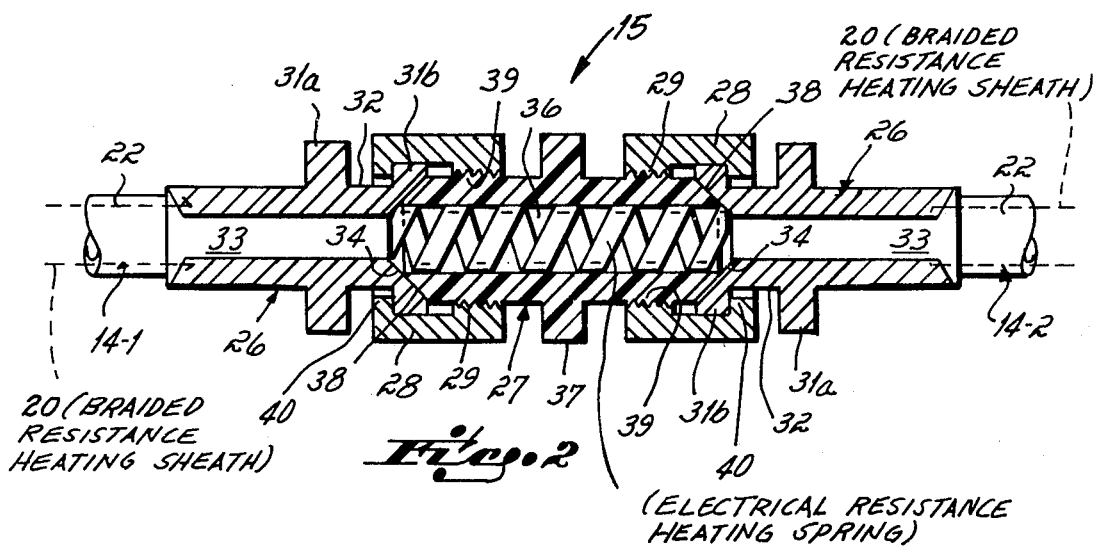
FIG. 2 is an enlarged partially cross-sectional view of the heater hose joint section of the hose of FIG. 1.

With reference to FIG. 2, there is illustrated the coupling or joint 15 for connecting the ends of two sections 14-1, 14-2 of hose 14. The joint comprises a pair of hose end fittings 26, an electrical insulating fitting 27, and a pair of hose swivel nuts 28. Internally of the electrical insulating fitting there is an electrical resistance heating spring 30 which, as explained more fully hereinafter, electrically interconnects the ends of the hose fittings 26 and heats the joint 15.

Each of the hose end fittings 26 is generally tubular in configuration and has a pair of flanges 31a, 31b extending outwardly from its periphery so as to define an annular channel or groove 32 therebetween. One flange 31a is preferably hexagonal in configuration to facilitate grasping of the flange with a tool, such as an open end wrench. Each fitting 26 has an axial bore or flow passage 33 extending therethrough which is in fluid communication with the inner tube 18 of the hose section to which the fitting is secured. This bore 33 terminates in an outwardly flaring or tapered mouth 34 at the outer end of the fitting.

Each fitting 26 is made of an electrically conductive material, as for example stainless steel, and is swaged or crimped onto the end of the braided hose so that the fitting is in physical and electrical contact with the end of the braided sheath 20 of the hose.

The electrical insulating fitting 27 is also generally tubular in configuration and provided with an axial bore or flow passage 36 extending therethrough. Medially of its length, the fitting 27 has outwardly extending flange 37, which is preferably hexagonal in shape, to facilitate grasping of the fitting with a conventional tool such as an open end wrench. The fitting 27 is tapered at each end as indicated at 38, so as to facilitate interfitting with the inward taper 34 of the fitting 26.

At each end, the insulating fitting 27 is peripherally threaded at 39 for the reception of the hose swivel nuts 28. These nuts each are made from steel or brass and have internally threaded sections 29 engageable with the threads 39 of the insulating fitting 27. The nuts also have inwardly extending flanges 40 engageable with the outwardly extending flange 31b of the hose end fittings 26. When the nuts 28 are threaded onto the threads 39 of the insulating fitting 27, the nuts cause the mating tapered surfaces 38, 34 of the hose end fittings 26 and the insulating fitting 27 to be moved into sealing engagement.

The electrical insulating fitting 27 is preferably manufactured from aluminum, the complete interior and exterior surface of which is coated with a hard anodized surface coating. This coating acts as an electrical insulator to prevent the passage of electrical current through the fitting.

Electrical current flows between the hose end fittings 26 of the two sections of hose 14-1, 14-2 interconnected by the joint 15 through the electrically conductive spring 30. This spring is made from a material which has an electrical resistance characteristic such that the flow of electrical current through the spring causes the spring to heat to a temperature sufficient to maintain the joint 15 at a preset temperature. In one particular embodiment of the invention wherein the constant power supply 16 supplies an electrical current of approximately 28 amperes through the braided sheath 20 and through the electrical resistance spring 30, the spring material was chosen such that the spring 30 had a resistance of 0.013 ohms. At this resistance and current flow, the spring 30 had a power consumption of 10 watts, the power necessary to maintain joint 15 at approximately 350° F. operating temperature. The particular spring 30 which had this resistance and which was capable of operating at a temperature of 425° F. without losing its resiliency, was made from an 18-8 type 302 stainless steel strip stock. A flat stainless steel strip stock approximately 0.013" thick by 0.250" wide was configured into a helical shape approximately 0.290" in outside diameter by 1.375" in length and having a pitch of approximately ⅜". This particular spring had the necessary power consumption to maintain the joint 25 at the desired 350° F. temperature.

In use, electrical current is supplied from the constant current power supply 16 to the multi-section hose 14 through electrical conductive connector 16b. This power supply is chosen to have a particular current output which, when supplied to the electrically conductive braided sheath 20 of the hose, will cause that braided sheath to heat the hose to a preset temperature, as for example a temperature on the order of 350° F. That same current is caused to flow from the braided sheath through the hose fittings 26 through the electrically conductive spring 30 to the next adjacent hose end fitting 26 and the braided sheath 20 of that next adjacent hose section 14-2, 14-n. In the course of passage through the electrical resistance material of which the spring 30 is made, the electrical current causes the spring to heat the electrical insulative fitting 27 to approximately the same temperature as the braided sheath 20 heats the hose sections 14-1 through 14-n. As a consequence of this construction of the hose and the joint, the joint 15 is maintained at approximately the same temperature as the heated sections of hose with the result that there are no cool spots or cold joints located along the length of the hose 14. Consequently, material flowing through the hose is maintained at an even temperature and if the hose is allowed to cool, as for example between shifts or overnight, the multi-section hose may be more quickly reheated and brought up to temperature because of the presence of the spring heater 30 in joint 15.

While I have described only a single preferred embodiment of my invention, persons skilled in this art will readily appreciate changes and modifications which may be made without departing from the spirit of my invention. For example, such persons will appreciate that I have described only a single modification of an electrical reisstance alloy spring 30 utilized as a heater of a multi-section hose, but that other materials and other spring configurations could be utilized in such an electrical resistance heater to obtain the same temperature or differing temperatures in the same or different heated hose environments. Therefore, I do not intend to be limited except by the scope of the following appended claims:

Having described my invention I claim:

1. A multi-section hose heating system including a plurality of heated hose sections and a heated joint interconnecting those sections, each of said hose sections comprising an inner fluid impervious, chemically inert tube, an electrically conductive multi-strand braided sheath snugly embracing the exterior of the inner tube for heating the inner tube, and an outer sheath of thermal insulating material surrounding the intermediate braided sheath for minimizing heat loss from the hose section, and said heated joint comprising an electrically conductive hose end fitting secured to one end of each of said hose sections, each of said hose end fittings being in electrically conductive contact with the electrically conductive braided sheath of the hose section to which the hose end fitting is secured, an electrical insulating fitting sealingly secured between two hose end fittings, and an electrical resistance compression spring located within the interior of said electrical insulating fitting, said spring being in compression with the ends of said spring being in electrically conductive contact with said two hose end fittings, and said spring having an electrical resistance such that the flow of electrical current through the spring from the braided sheath of one hose section to that of the other produces sufficient heat in the insulating fitting that the interior of said joint is maintained at approximately the same temperature as the interior of said heated hose sections.

2. The hose heating system of claim 1 in which said spring is made from a material which is capable of operating and maintaining its resiliency at a temperature in excess of 300° F.

3. The hose heating system of claim 1, in which said spring is made from stainless steel alloy.

4. The hose heating system of claim 1, in which said spring is made from flat stainless steel alloy wound into a helical configuration.

5. The hose heating system of claim 1 in which each of said hose end fittings has a tapered end surface engaged with a tapered end surface of said electrical insulating fitting.

6. The hose heating system of claim 1, in which each of said hose end fittings has an inwardly tapered end surface engaged with an outwardly tapered end surface of said electrical insulating fitting.

7. The hose heating system of claim 6, in which each of said hose end fittings is secured to one end of said electrical insulating fitting by one of a pair of hose swivel nuts.

8. The hose heating system of claim 7, in which each of said hose end fittings has a peripheral shoulder engaged with an inwardly extending flange of one of said pair of hose swivel nuts.

9. The hose heating system of claim 8, in which said electrical insulating fitting has a pair of spaced peripheral threaded sections, each of said pair of hose swivel nuts being threaded over one threaded section of said electrical insulating fitting.

10. A multi-section hose heating system including a plurality of heated hose sections and a heated joint interconnecting those sections, each of said hose sections comprising an inner fluid impervious tube, an electrical resistance heating element wrapped about the exterior surface of the inner tube for heating the inner tube, and an outer sheath of thermal insulating material surrounding the electrical resistance heating element for minimizing heat loss from the hose section, and said heated joint comprising an electrically conductive hose end fitting secured to one end of each of said hose sections, each of said hose end fittings being in electrically conductive contact with said electrical resistance heating element of the hose section to which the hose end fitting is secured, an electrical insulating fitting sealingly secured between two hose end fittings, and an electrical resistance compression spring located within the interior of said electrical insulating fitting, said spring being in compression with the ends of said spring being in electrically conductive contact with said two hose end fittings, and said spring having an electrical resistance such that the flow of electrical current through the spring from the heating element of one hose section to that of the other produces sufficient heat in the insulating fitting that the interior of said joint is maintained at approximately the same temperature as the interior of said heated hose sections.

11. The hose heating system of claim 10, in which said spring is made from a material which is capable of operating and maintaining its resiliency at a temperature in excess of 300° F.

12. The hose heating system of claim 10, in which said spring is made from stainless steel alloy.

13. The hose heating system of claim 10, in which said spring is made from flat stainless steel alloy wound into a helical configuration.

14. The hose heating system of claim 10, in which each of said hose end fittings has a tapered end surface engaged with a tapered end surface of said electrical insulating fitting.

15. The hose heating system of claim 10, in which each of said hose end fittings has an inwardly tapered end surface engaged with an outwardly tapered end surface of said electrical insulating fitting.

16. The hose heating system of claim 15, in which each of said hose end fittings is secured to one end of said electrical insulating fitting by one of a pair of hose swivel nuts.

17. The hose heating system of claim 16, in which each of said hose end fittings has a peripheral shoulder engaged with an inwardly extending flange of one of said pair of hose swivel nuts.

18. The hose heating system of claim 17 in which said electrical insulating fitting has a pair of spaced peripheral threaded sections, each of said pair of hose swivel nuts being threaded over one threaded section of said electrical insulating fitting.

* * * * *